C. RENTON.
Process for Forming the Ends of Carriage-Slat Bows.
No. 167,690. Patented Sept. 14, 1875.
Fig. 1.
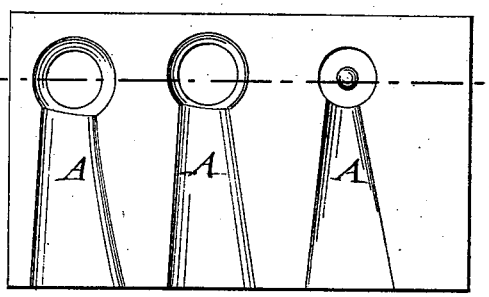
Fig. 2.
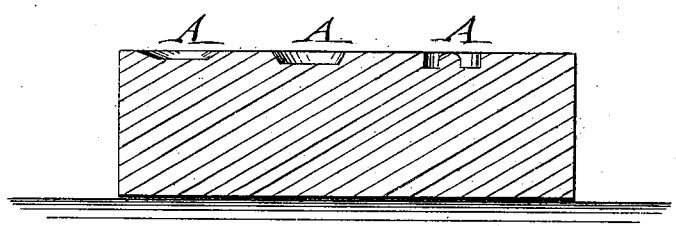
Fig. 3. Fig. 4.
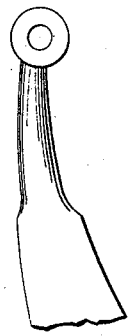 

UNITED STATES PATENT OFFICE.

CHARLES RENTON, OF MERIDEN, CONNECTICUT.

IMPROVEMENT IN PROCESSES FOR FORMING THE ENDS OF CARRIAGE-SLAT BOWS.

Specification forming part of Letters Patent No. 167,690, dated September 14, 1875; application filed July 24, 1875.

*To all whom it may concern:*

Be it known that I, CHARLES RENTON, of Meriden, in the county of New Haven and State of Connecticut, have invented a new and Improved Die for Shaping the Ends of Carriage-Slat Bows, &c., of which the following is a specification:

The object of my invention is to provide an improved die for forming the ends of slat-bows for carriage-tops, or similar forgings, so that the same are produced in quicker, stronger, and more perfect manner; and the invention consists in passing the ends of the slat-bows through a series of gradually narrowing and deepening dies with inclined edges, which raise the stock by the impressions given to the ends without the edging used at present.

In the accompanying drawing, Figure 1 represents a top view of the die through which the ends of the slat-bows are passed; Fig. 2, a vertical longitudinal section of the same on the line *c c*, Fig. 1, and Figs. 3 and 4 are respectively side and end views of the end of the slat-bow after leaving the final shaping-die.

Similar letters of reference indicate corresponding parts.

Hitherto the ends of slat-bows were shaped by passing them through a series of vertically-edged dies, which diminished in width but increased in depth, the ends being edged before being exposed to the impression of the next die. This welding on of the edges produced cracks and weakened the ends at the point of greatest wear. To avoid this and produce the ends of the slat-bows in even and perfect manner, the slat-bow or other blanks are exposed to the action of a series of shaping-dies, A, with inclined edges, whose degree of inclination gradually increases toward the vertical edge of the last die, while, at the same time the width of the die is decreasing and the depth increasing, as shown in Fig. 2. The inclined edges draw the stock of the ends inwardly, so as to raise the same until finally nearly double the thickness of the slat-bow is obtained, producing in this manner but small waste, and dispensing entirely with the time-consuming and unsatisfactory edging process.

Having thus described my invention, I claim as new and desire to secure by Letters Patent—

The method herein described of shaping the ends of carriage-slat bows, &c., consisting in passing them through a series of dies with tapering edges, of gradually-increasing inclination and of decreasing width and increasing depth, substantially as and for the purpose set forth.

CHARLES RENTON.

Witnesses:
    DANIEL F. SOUTHWICK,
    ALBERT J. BECKLEY.